US007639761B2

(12) United States Patent
Chu et al.

(10) Patent No.: US 7,639,761 B2
(45) Date of Patent: Dec. 29, 2009

(54) DETECTING AND MEASURING INTERFERENCE CONTAINED WITHIN A DIGITAL CARRIER

(75) Inventors: Jeffrey C. Chu, Los Altos, CA (US); Michael L. Downey, Fremont, CA (US)

(73) Assignee: Glowlink Communications Technology, Inc., Los Altos, CA (US)

( * ) Notice: Subject to any disclaimer, the term of this patent is extended or adjusted under 35 U.S.C. 154(b) by 783 days.

(21) Appl. No.: 10/375,221

(22) Filed: Feb. 26, 2003

(65) Prior Publication Data

US 2003/0165205 A1 Sep. 4, 2003

Related U.S. Application Data

(60) Provisional application No. 60/361,493, filed on Mar. 4, 2002.

(51) Int. Cl.
*H03D 1/04* (2006.01)
*H03H 7/30* (2006.01)
(52) U.S. Cl. ................................ 375/346; 375/230
(58) Field of Classification Search ............... 375/346, 375/316, 229, 230, 232, 233, 148, 147, 144, 375/141, 140; 333/18, 28 R; 708/323; 329/318, 329/319, 320, 349, 63.1, 296; 455/63.1, 455/296

See application file for complete search history.

(56) References Cited

U.S. PATENT DOCUMENTS

| | | | | |
|---|---|---|---|---|
| 3,611,411 A | * | 10/1971 | Moshier et al. | 346/35 |
| 3,631,335 A | * | 12/1971 | Carr et al. | 324/212 |
| 3,878,392 A | * | 4/1975 | Yew et al. | 250/306 |
| 4,093,989 A | * | 6/1978 | Flink et al. | 324/76.28 |
| 4,280,765 A | * | 7/1981 | Pophillat et al. | 356/73.1 |
| 4,413,522 A | * | 11/1983 | Leatherwood et al. | 73/646 |
| 4,644,562 A | | 2/1987 | Kavehrad et al. | |
| 4,692,117 A | * | 9/1987 | Goodwin | 434/185 |
| 4,941,199 A | | 7/1990 | Saam | |
| 5,119,017 A | * | 6/1992 | Labarre et al. | 324/76.19 |
| 5,155,742 A | * | 10/1992 | Ariyavisitakul et al. | 375/231 |
| 5,297,186 A | * | 3/1994 | Dong | 375/222 |

(Continued)

FOREIGN PATENT DOCUMENTS

EP   0 453 213 A   10/1991

(Continued)

OTHER PUBLICATIONS

Simon Haykin, Communication Systems, 4th Edition, 2001, John Wiley & Sons, Inc. Hoboken, NJ.

(Continued)

*Primary Examiner*—Tesfaldet Bocure
*Assistant Examiner*—Vineeta S Panwalkar
(74) *Attorney, Agent, or Firm*—Westberg Law Offices

(57) ABSTRACT

A method and system for measuring noise and or interference in a communications signal without taking the signal out of service. In the present invention the communications signal is converted from an RF signal into an IF signal. The IF signal is then digitized and stored. The stored signal is processed to determine the interference signal. The interference signal is calculated from an error vector produced by a blind equalizer demodulator. The interference signal is extracted and presented to a user.

38 Claims, 4 Drawing Sheets

U.S. PATENT DOCUMENTS

| | | | |
|---|---|---|---|
| 5,546,429 A | | 8/1996 | Chiasson et al. |
| 5,574,974 A | | 11/1996 | Almgren et al. |
| 5,619,533 A | | 4/1997 | Dent |
| 5,687,195 A | | 11/1997 | Hwang et al. |
| 5,708,681 A | | 1/1998 | Malkemes et al. |
| 5,731,993 A | | 3/1998 | Wachs et al. |
| 5,881,096 A | | 3/1999 | Majkrzak et al. |
| 6,006,110 A | * | 12/1999 | Raleigh ............... 455/561 |
| 6,014,412 A | * | 1/2000 | Wiese et al. ........... 375/346 |
| 6,049,574 A | * | 4/2000 | Noonan et al. .......... 375/346 |
| 6,061,393 A | | 5/2000 | Tsui et al. |
| 6,085,094 A | * | 7/2000 | Vasudevan et al. ...... 455/447 |
| 6,128,353 A | | 10/2000 | Ho et al. |
| 6,137,809 A | * | 10/2000 | Martinez et al. ........ 370/503 |
| 6,418,164 B1 | | 7/2002 | Endres et al. |
| 6,522,987 B1 | * | 2/2003 | Flink et al. ............ 702/122 |
| 6,549,755 B2 | | 4/2003 | Chu et al. |
| 6,606,129 B1 | * | 8/2003 | Limberg ............... 348/614 |
| 6,678,317 B1 | * | 1/2004 | Murakami et al. ........ 375/232 |
| 6,947,497 B1 | * | 9/2005 | Ahn ................... 375/326 |
| 6,975,689 B1 | * | 12/2005 | McDonald et al. ........ 375/316 |
| 6,996,199 B2 | * | 2/2006 | Storm et al. ............ 375/350 |
| 2002/0122511 A1 | * | 9/2002 | Kwentus et al. ......... 375/343 |
| 2003/0161418 A1 | * | 8/2003 | Steele et al. ........... 375/346 |

FOREIGN PATENT DOCUMENTS

| | | |
|---|---|---|
| EP | 0 684 706 A | 11/1995 |
| EP | 0 812 105 A | 12/1997 |
| EP | 0 844 805 A1 | 5/1998 |
| EP | 1 115 216 A | 7/2001 |
| WO | WO 95/26101 A1 | 9/1995 |

OTHER PUBLICATIONS

J. R. Treichelr, M. G. Larimore, J. C. Harp, Practical Implementations of Blind Demodulators, Asilomar Conference on Signals, Systems & Computers 1997 : Pacific Grove, Calif, 1998, IEEE Computer Society Press, Los Alamitos. <http://www.appsig.com/papers/1829d/829d_1.html>.

Supplementary European Search Report for European Patent App. No. EP 03711260.4 (counterpart to U.S. Appl. No. 10/375,221), dated May 18, 2009.

International Preliminary Examination Report for International Application No. PCT/US03/05823 (which claims priority of U.S. Appl. No. 10/375,221), dated Jul. 23, 2004.

Examiner's First Report on Australian Patent Application No. 2003213579 (Australian counterpart of U.S. Appl. No. 10/375,221), issued by IP Australa, dated Mar. 21, 2007.

Communication from European Patent Office for European Patent App. No. EP 03711260.4 (counterpart to U.S. Appl. No. 10/375,221), dated Jul. 31, 2009.

* cited by examiner

DETECTING AND MEASURING INTERFERENCE CONTAINED WITHIN A DIGITAL CARRIER

This application claims the benefit of U.S. Provisional Application Ser. No. 60/361,493, filed Mar. 4, 2002, the contents of which are hereby incorporated by reference.

FIELD OF THE INVENTION

The invention relates to detection of interference and noise in a transmitted signal.

DESCRIPTION OF THE RELATED ART

Interference (including noise) showing up in-band to a transmitted carrier is a common problem in wireless communication systems. For example, in satellite communication systems, interference can be caused by, but is not limited to, isolation degradation of cross-polarized signals, adjacent satellite traffic, locally received terrestrial signals, or an unauthorized transmission. In many cases, interference can be very difficult to detect, however, its impact on the receive quality of the transmitted digital carrier can be significant.

The most common approach to determining the presence of interference is to temporarily remove the service (the transmitted carrier) and inspect the received power spectrum with a frequency analysis device such as a spectrum analyzer. Although this approach can be effective, it causes a service interruption that can last for many hours. In some cases, interference is not the problem, and the service was interrupted unnecessarily.

BRIEF SUMMARY OF THE INVENTION

The invention includes a method of and an apparatus for detecting and measuring noise and interference, which is in-band to a received communications carrier. To alleviate drawbacks to conventional approaches, the applicant has developed a non-intrusive interference detection and noise measurement approach. With this approach, interference and noise can be detected and measured without taking the carrier out of service. Rather, the measurements are made while the communications circuit (the transmitted carrier) is active.

In one aspect, in-band interference in a carrier signal in a communication system is detected. A signal is acquired including the carrier signal and an interfering signal. The interfering signal is extracted from the carrier without interrupting the carrier.

In another aspect, a signal is received, filtered, and digitized. Decimation is then performed and the signal resampled. Blind equalization and demodulation are performed thereby forming an error vector that is representative of the interference signal.

In yet another aspect, a receiver acquires a digital signal. A signal processor conditions the digital signal, and a blind equalizer demodulator forms an error vector that is representative of an interference signal included in the carrier signal.

These and other aspects are described in more detail herein.

DETAILED DESCRIPTION OF INVENTION

Figure 1:
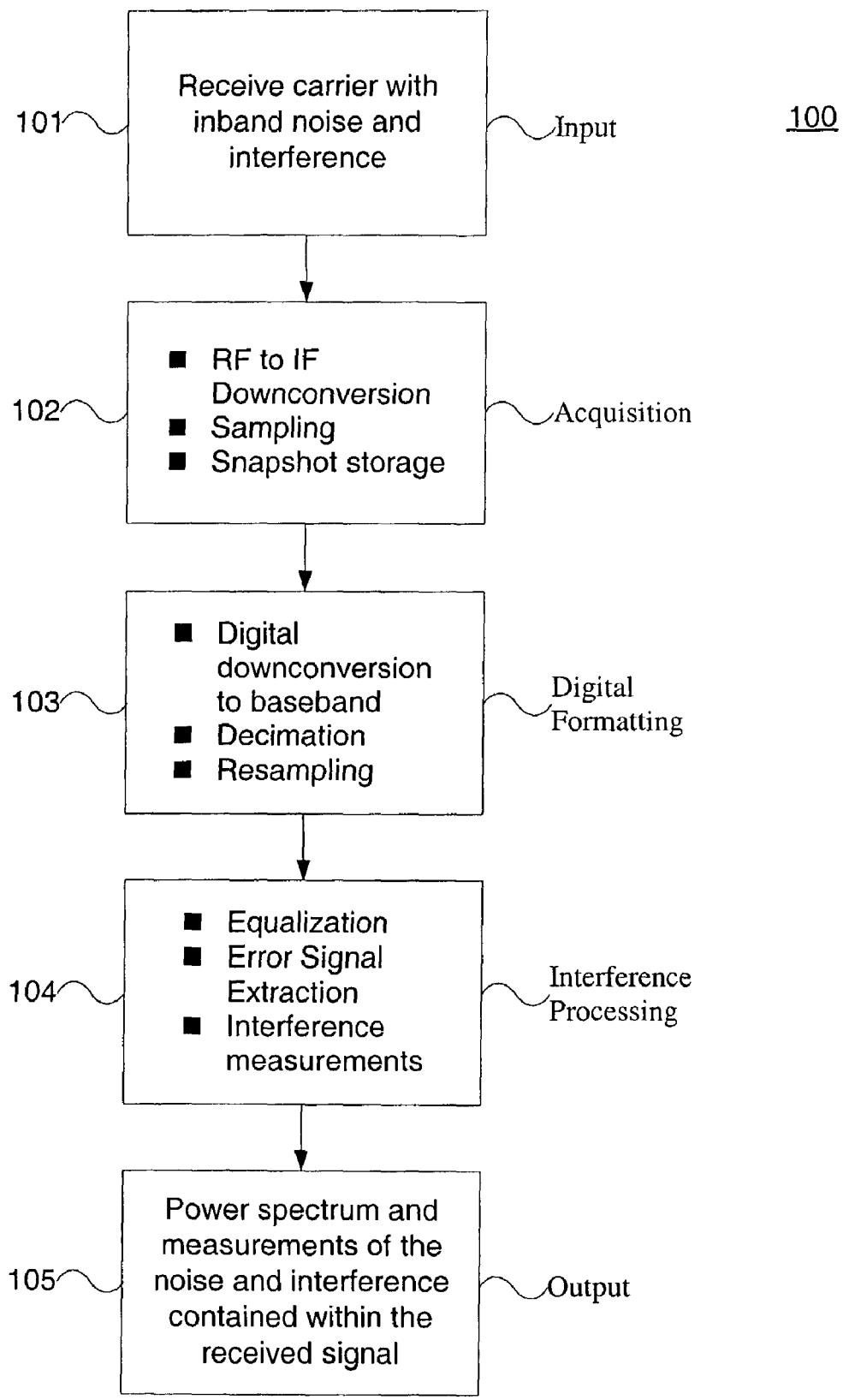
FIG. 1 illustrates a flow diagram showing the main processing associated with this invention.

FIG. 1 shows a flow diagram of a process 100 in accordance with an aspect of the present invention. A signal, which contains noise and interference, is received in a step 101. The signal is down-converted to an intermediate frequency (IF) and then digitized by a sampling device, in an acquisition step 102. The digital samples are stored in memory for further processing, also in the acquisition step 102. Using the stored samples, the signal is processed to create a re-sampled baseband version of the received signal, in a digital formatting step 103. Using this re-sampled baseband signal, an equalized error signal is created, in an interference processing step 104. This error signal is further processed to create a power spectrum of the underlying noise and interference contained in the received carrier, also in the interference processing step 104. This power spectrum of the noise and interference can be measured for interfering signals as well as displayed to the user, in an output step 105.

Figure 2:
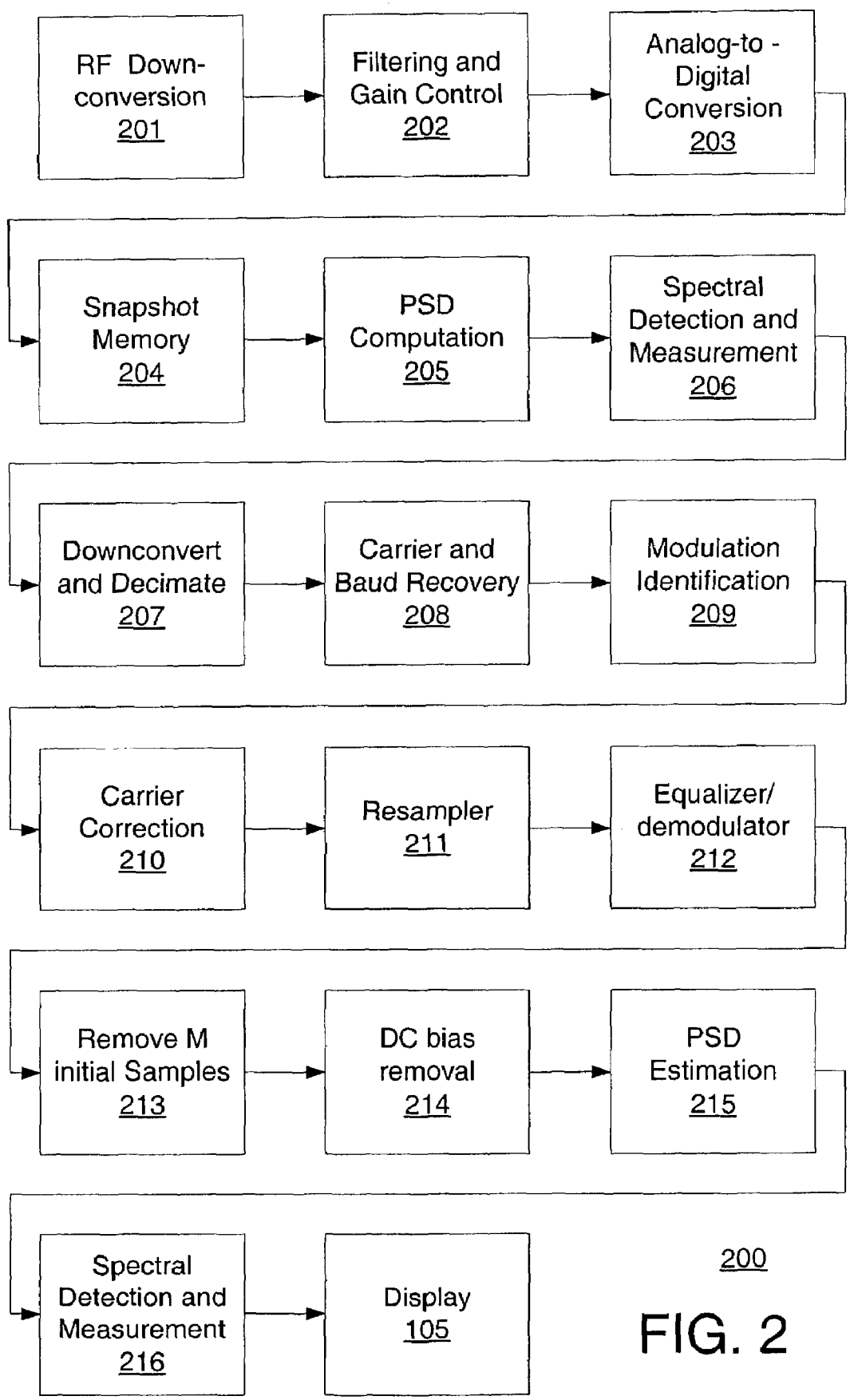
FIG. 2 shows a detailed flow diagram of the processing associated with this invention.

FIG. 2 is a more detailed flow diagram of a process 200 in accordance with an embodiment of the present invention. An input signal may be a radio frequency (RF) signal from an antenna. Alternatively the input signal may be any communication signal in any frequency band i.e. RF, IF, microwave or optical.

Figure 3:
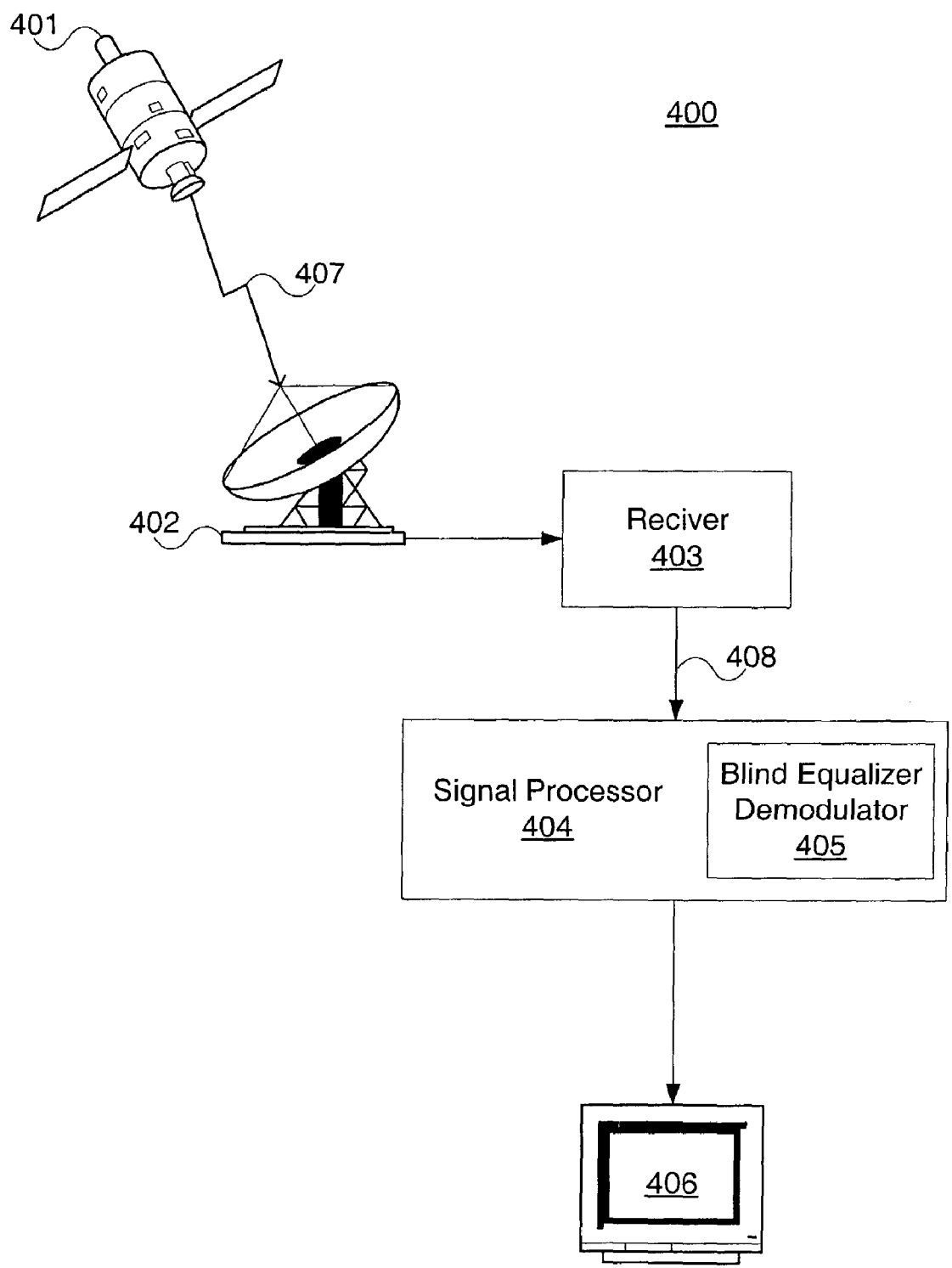
FIG. 3 illustrates a system in accordance with an embodiment of the present invention.

FIG. 3 illustrates a system 400 in accordance with an embodiment of the present invention. The system 400 detects and measures in-band interference and noise in an input signal 407 in accordance with the method of FIG. 2. An input signal 407 is received from a satellite 401 by a satellite dish 402. The input signal 407 may be transmitted by means other than the satellite 401, including but not limited to a radio transmitter, a cable transmitter, a cell tower, a microwave transmitter, or an optical transmitter. The input signal 407 may be received by means other than the satellite dish 402, including but not limited to an antenna, a microwave dish, or an optical receiver. The present invention is applicable to any system that communicates a digital signal from a transmitter to a receiver, regardless of the medium or the carrier frequency.

Referring to FIGS. 2 and 3, a receiver 403 may convert the input signal 407 from an RF input signal 407 to an IF signal in a step 201. The IF signal may be at any frequency that makes the following detection simpler, cheaper, or more accurate. The receiver 403 may further filter and adjust the level of a signal, which is representative of the input signal 407 in a step 202. The receiver 403 may filter the input signal 407 with a band-pass filter to limit the input signal 407 or its representative to the carrier and its modulation. An amplifier with automatic gain control may adjust the level of the filtered input signal 407 or its representative, also in the step 202. The input signal 407 may be amplified to take full advantage of an A/D converter in the receiver 403. The A/D converter is expected to perform best when the full amplitude bandwidth is used.

The A/D converter, in the step 203, produces a digitized version of the filtered IF signal. The A/D converter may sample the IF signal at a frequency at least twice the frequency of the highest frequency of interest in accordance with Nyquist's theorem, though another sampling frequency may be used. The digitized version of the IF signal is then stored as a snapshot 408 in a step 204. The above steps 201-204 may comprise the acquisition step 102 of FIG. 1.

A signal processor 404 may analyze the snapshot 408 to calculate parameters representative of the input signal 407 including, a bandwidth of the input signal 407, a center frequency of the input signal 407, a symbol rate of the input signal 407, amplitudes of the carrier lines, frequencies of the carrier lines, and maximums of the carrier lines.

In a next step 205 of the process 200, a power spectrum of the snapshot 408 is calculated by the signal processor 404. Multiple power spectrums may be calculated and averaged together, to create a spectral density periodogram. The power spectrum may be calculated using conventional Fast-Fourier Transform (FFT) methods, for converting the IF signal from time space to complex frequency space. Other methods beside FFT may be used to convert the IF signal to frequency space. The power spectrum or the spectral density periodogram may be displayed to user at this time.

The input signal may be a modulated carrier. The center frequency and bandwidth (BW) of the carrier may be calculated by a signal processor 404 in a step 206 using the power spectrum or the spectral density periodogram of the IF signal from step 205. If the center frequency and the bandwidth are already known, however, then the steps 205 and 206 may be skipped.

Once the center frequency of the carrier is known, down-converting of snapshot 408 to the baseband of the carrier may be performed in step 207 by the signal processor 404. The snapshot 408 may be further filtered such that the signal is limited in bandwidth to that of the baseband signal, also in step 207. Further, the snapshot 408 may be decimated also in a step 207. Decimation may be performed at a frequency at least twice the frequency of the highest frequency of interest in accordance with Nyquist's theorem.

The carrier signal may have multiple carrier lines. In a step 208, information about the carrier such as symbol rate, and estimates of the amplitude and frequency of the carrier lines may be calculated. This information may be calculated by performing magnitude, square, cube and quad power transforms on the signal and recovering the maximums.

The estimates of the amplitude and frequency of the carrier lines may be used to determine the modulation of the digital carrier and the frequency in a step 209. By inspecting maximums of the carrier lines, the modulation of the carrier may be determined. Using information about the carrier frequency, any down-conversion error in the decimated signal may be removed in a step 210. For example if the baseband signal is offset, it may be recentered such that any offset in the carrier frequency is removed.

In a step 211, the carrier signal may be re-sampled by the signal processor 404, such as at a sample rate of two samples per symbol, and a resampled signal may be an output. This sample rate may be determined from the symbol rate calculated in the step 208. The above steps 205-211 may be performed in the digital formatting step 103 of FIG. 1.

A blind equalizer demodulator 405 may calculate an error vector that is representative of the interference signal in the input signal 407 in a step 212. This step produces an error vector that may be used to calculate the interference signal that is in the input signal 407. A digital communication system modulates a carrier wave for transmitting symbols to a receiver. In such a digital system, each symbol has discrete levels of amplitude and/or phase at which the carrier is modulated. A goal of the demodulator 405 is to determine the levels at which the carrier is modulated. It does this by making a first initial guess of the modulation levels and then calculating an error vector that represents the difference between the initial guess and the measured signal. Then the guessed modulation levels are adjusted to minimize an error function based on the error vectors. The guessed modulation levels are continuously adjusted until the error function has been minimized, at which point the modulation has converged. There are many ways to adjust the levels, including decision directed least mean square (DD-LMS) and constant modulus algorithm (CMA), both of which are well known in the literature. Conventionally the blind equalizer demodulator 405 is used to calculate the symbols in the input signal 407. Here, the output of interest is the error vector as opposed to the prior art where the output of interest is the symbols.

In a step 213, a first M samples are removed from the error vector to produce a new error vector. Depending on the quality of the initial first guess, the first M samples may have large error vectors that do not truly represent the noise and interference in the input signal 407. Before the blind equalizer demodulator 405 converges in the step 212, the first M samples of the error vector may contain errors. The DC bias of the new error vector is removed in a step 214, by subtracting the mean of the new error vector from the new error vector to produce an in-band vector that is representative of noise and interference in-band to the carrier. Any processing artifacts may also be removed in the step 214. The power spectrum of the in-band vector is calculated to convert the complex time representation of the in-band vector into a frequency domain representation, in a step 215. In a step 216 the spectral properties of the in-band vector are measured such as center frequency, BW, power, C/N and detected interference energy. The above steps 212-216 may comprise the interference processing step 104 of FIG. 1 performed by signal processor 405.

Figure 4:
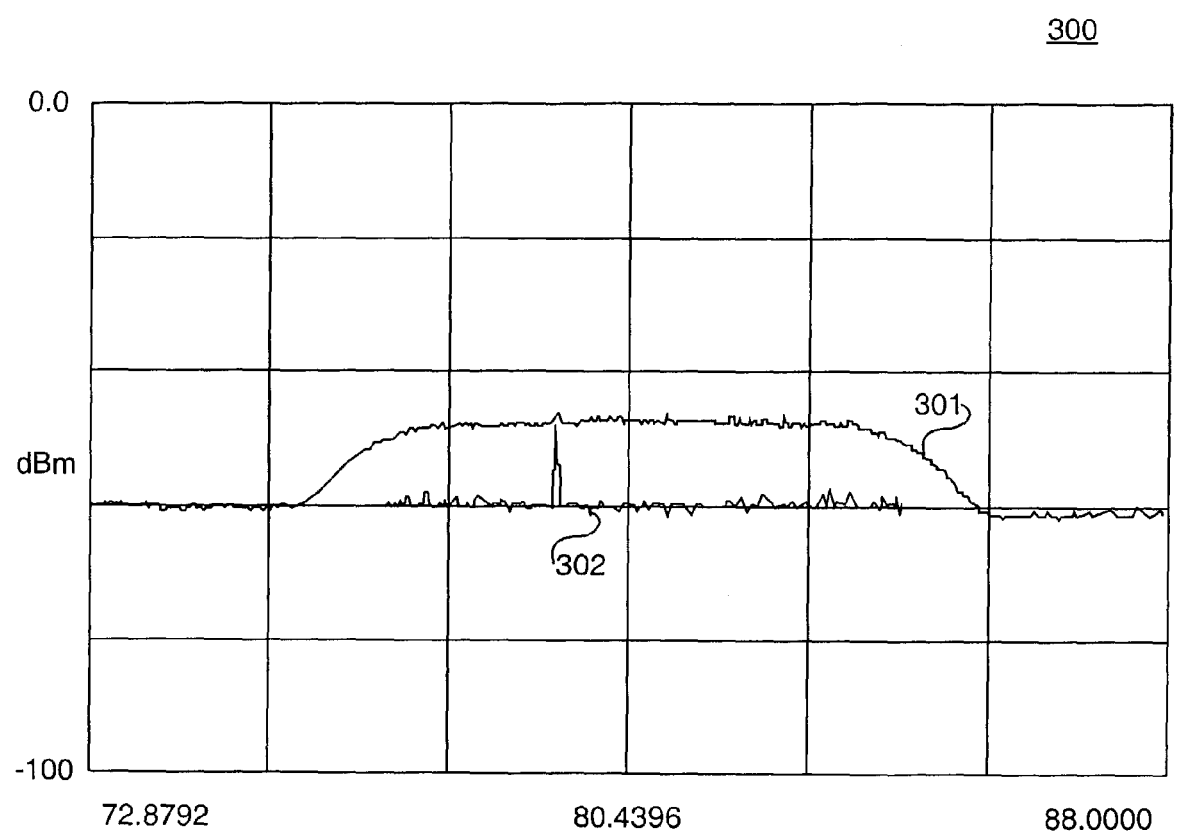
FIG. 4 shows a graphical display that might be displayed to a user of this invention.

A power spectrum of the error vector, such as a trace 302 in a FIG. 4, may be sent to a display 406 for presentation to a user in a step 105. A power spectrum of the input signal 407, such as trace 301 in FIG. 4, may also be sent to the display 406 also in step 105. Furthermore, the spectral properties of the error vector may be sent to the display 406. Other calculations regarding the digital signal may also be sent to the display 406.

The system described in FIG. 3 may also implement all the steps in the flowchart 200 of FIG. 2 and Table 1 as follows. The system may be implemented in hardware and/or software. The system may be implemented in a standard PC and/or may be implemented with custom electronics.

Table 1 presents the method of FIG. 2 in tabular format.

TABLE 1

| Functional Block | Input | Description | Output |
|---|---|---|---|
| RF Down-conversion (201) | From Antenna | Convert RF signal to IF Frequency | IF representation of signal |
| Filtering and Gain Control (202) | IF Signal | Band-limit signal and adjust signal level for A/D Converter | Filtered and amplified signal |

TABLE 1-continued

| Functional Block | Input | Description | Output |
| --- | --- | --- | --- |
| A/D Conversion (203) | Filtered IF Signal | Convert analog signal at IF to digital samples | Samples of IF signal |
| Snapshot Memory (204) | Samples of IF Signal | Store IF samples | Samples of IF signal |
| PSD Computation (205) | Samples of IF Signal | Convert time domain representation of signal to frequency domain representation. | Power spectrum |
| Spectral Detection and Measurement (206) | Power Spectrum | Detect and measure carrier of interest | Center frequency and BW of carrier to analyze |
| Down-convert and decimate (207) | Samples of IF signal, center frequency and BW estimation | Down-convert carrier to baseband, filter and decimate | Decimated signal (complex signal representation) and decimated sample rate |
| Carrier and Baud Recovery (208) | Decimated Signal | Perform magnitude, square, cube and quad power transforms on signal. Recover maximums | Symbol rate, estimates of amplitude and frequency of carrier lines |
| Modulation Identification (209) | Estimates of amplitude and frequencies of carrier lines | Determine Modulation of digital carrier by inspecting carrier line maximums | Modulation of digital carrier and Carrier frequency |
| Carrier Correction (210) | Decimated signal and Carrier frequency | Remove down-conversion error from decimated signal | Decimated signal |
| Re-sampler (211) | Decimated signal, Decimated sample rate and symbol rate of carrier | Re-sample carrier to 2 samples/symbol | Re-sampled signal |
| Equalizer/Demodulator (212) | Resampled Signal | Equalize and demodulate signal using blind equalizer/demodulator approach | Estimated symbols and Error vector |
| Remove M Initial samples (213) | Error Vector | Remove first M samples from Error vector. First M samples contain errors from matched filter error | New Error Vector |
| DC bias removal (214) | New Error Vector | Remove mean from New Error Vector | In-band vector (represents noise and interference in-band to carrier) |
| PSD Computation (215) | In-band vector | Convert complex time domain in-band vector to a frequency domain representation | In-band spectrum |
| Spectral detection and measurement (216) | In-band Spectrum | Detect and measure any spectral energy | In-band spectral measurements (Center frequency, BW, power, and C/N of any detected interference energy) |
| Display (217) | In-band Spectrum and In-band spectral measurements | Display spectrum and measurement results to user | Done |

FIG. 4 shows a graphical display 300 of data that the invention may present to a user. The trace 301 represents the power spectrum of the received carrier, and the trace 302 represents the power spectrum of the noise and interference, which are in-band to the received carrier. In this example, an interfering signal can be seen in the trace 302, which is not visible in the received carrier trace 301.

Thus, a technique has been described for detecting and measuring interference within a digital carrier. The process can be completely blind, meaning that the process described above will work even when the digital carrier's RF and modulation parameters are unknown. The process described detects the RF carrier, measures its RF and modulation parameters, equalizes and demodulates the digital carrier, extracts an error vector, converts this error vector into a complex baseband estimate of the noise and interference. From this estimate, a power spectrum of the in-band noise and interference is created. This power spectrum is analyzed for spectral energy. The in-band spectrum and measurement results are displayed for a user.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of detecting in-band interference in a carrier signal in a communication system comprising the steps of:
   acquiring a digital signal comprising the carrier signal and an in-band interference signal having a source that is independent from that of the carrier signal, said acquiring including receiving the signal at a receiver, filtering the signal and digitizing the signal;
   formatting the digital signal including filtering the digital signal, and performing decimation and re-sampling of the digitized signal; and
   extracting the interference signal without interrupting the carrier signal by performing blind equalization and demodulation using a blind equalizer demodulator thereby forming an error vector that is representative of the in-band interference signal.

2. The method according to claim 1, wherein the step of formatting the digital signal is performed without knowledge of the carriers RF or modulation parameters.

3. The method according to claim 1, wherein the step of formatting the digital signal is performed with knowledge of the carriers RF or modulation parameters.

4. The method according to claim 1, further comprising extracting noise from the digital signal.

5. The method according to claim 1, wherein the communication system performs as a wireless communication system.

6. The method according to claim 1, wherein the communication system performs as a satellite communication system.

7. The method according to claim 1, wherein the carrier comprises an RF signal.

8. The method according to claim 1, wherein acquiring the digital signal includes converting the carrier signal into an IF signal, wherein the IF signal is representative of the carrier signal.

9. The method according to claim 1, wherein filtering the digital signal includes filtering the carrier signal to limit the bandwidth to a signal of interest.

10. The method according to claim 1, wherein acquiring a digital signal includes storing a digitized filtered signal into memory.

11. The method according to claim 1, wherein formatting the digital signal includes calculating a center frequency and a bandwidth of the carrier signal.

12. The method according to claim 1, wherein filtering the digital signal includes down-converting the digital signal to the baseband of the carrier signal.

13. The method according to claim 1, wherein the re-sampling of the digital signal occurs at twice the frequency of interest.

14. The method according to claim 1, including removing M initial samples of the error vector, wherein the M initial samples occur while the blind equalization and demodulation is still converging.

15. The method according to claim 1, including removing a DC bias from the error vector.

16. A system for detecting in-band interference in a carrier signal in a communication system comprising:
   a receiver for acquiring a digital signal, the digital signal including a carrier signal and an in-band interference signal having a source that is independent from that of the carrier signal, a signal processor for conditioning the digital signal and a blind equalizer demodulator for extracting the in-band interference signal without interrupting the carrier signal by forming an error vector that is representative of the in-band interference signal included in the digital signal and wherein the signal processor is further configured to process the interference signal to obtain one or more spectral properties of the interference signal.

17. The system according to claim 13, wherein the signal processor is without knowledge of the carriers RF or modulation parameters.

18. The system according to claim 16, wherein the signal processor knows of the carriers RF or modulation parameters.

19. The system according to claim 16, wherein the digital signal further comprises noise.

20. The system according to claim 16, wherein the communication system performs as a wireless communication system.

21. The system according to claim 16, wherein the communication system performs as a satellite communication system.

22. The system according to claim 16, wherein the carrier comprises an RF signal.

23. The system according to claim 16, wherein the receiver is further configured to convert the carrier signal into an IF signal, wherein the IF signal is representative of the carrier signal.

24. The system according to claim 16, wherein the receiver is further configured to filter the carrier signal to limit the bandwidth to a signal of interest.

25. The system according to claim 16, wherein the receiver is further configured to stores a digitized filtered signal in memory.

26. The system according to claim 16, wherein the signal processor is further configured to calculates a center frequency and a bandwidth of the carrier signal.

27. The system according to claim 16, wherein the signal processor is further configured to down convert the digital signal to the baseband of the carrier signal.

28. The system according to claim 16, wherein the signal processor is further configured to decimate the digital signal at twice the symbol rate.

29. The system according to claim 16, wherein the signal processor is further configured to remove M initial samples of the error vector, wherein the M initial samples occur while the blind equalization and demodulation is still converging.

30. The system according to claim 16, wherein the signal processor is further configured to remove a DC bias from the error vector.

31. The system according to claim 16, wherein the receiver is further configured to receive the signal, filter the signal and digitize the filtered signal.

32. The method according to claim 1, further comprising processing the error vector to obtain one or more spectral properties of the interference signal.

33. The method according to claim 32, wherein the spectral properties are selected from a group consisting of a power spectrum of the interference signal and a detected energy of the interference signal.

34. The method according to claim 32, wherein the spectral properties are selected from a group consisting of a center frequency of the interference signal and a bandwidth of the interfering signal.

35. The method according to claim 32, further comprising displaying the one or more spectral properties.

36. The system according to claim 16, wherein the spectral properties are selected from a group consisting of a power spectrum of the interference signal and a detected energy of the interference signal.

37. The system according to claim 16, wherein the spectral properties are selected from a group consisting of a center frequency of the interference signal and a bandwidth of the interference signal.

38. The system according to claim 16, further comprising a display that displays the one or more spectral properties.

* * * * *

UNITED STATES PATENT AND TRADEMARK OFFICE
CERTIFICATE OF CORRECTION

PATENT NO.       : 7,639,761 B2
APPLICATION NO.  : 10/375221
DATED            : December 29, 2009
INVENTOR(S)      : Chu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Twenty-first Day of December, 2010

David J. Kappos
*Director of the United States Patent and Trademark Office*